(12) United States Patent  
Morishige

(10) Patent No.: US 7,561,505 B2
(45) Date of Patent: Jul. 14, 2009

(54) DISK APPARATUS

(75) Inventor: Tomomitsu Morishige, Daito (JP)

(73) Assignee: Funai Electric Co., Ltd. (JP)

( * ) Notice: Subject to any disclaimer, the term of this patent is extended or adjusted under 35 U.S.C. 154(b) by 514 days.

(21) Appl. No.: 11/541,697

(22) Filed: Oct. 3, 2006

(65) Prior Publication Data

US 2007/0076549 A1    Apr. 5, 2007

(30) Foreign Application Priority Data

Oct. 5, 2005    (JP) .............................. 2005-293080

(51) Int. Cl.
*G11B 19/00*    (2006.01)
(52) U.S. Cl. .................... 369/47.38; 369/53.3
(58) Field of Classification Search ............. 369/47.38, 369/47.41, 47.44, 47.46, 53.3, 53.37; 360/71, 360/73.01
See application file for complete search history.

(56) References Cited

U.S. PATENT DOCUMENTS

| | | | |
|---|---|---|---|
| 4,653,040 A | 3/1987 | Senso | 369/239 |
| 5,042,025 A | 8/1991 | Aoyagi et al. | 369/190 |
| 5,748,591 A | 5/1998 | Nakai | 369/58 |
| 5,956,307 A * | 9/1999 | Koudo et al. | 369/47.43 |
| 6,195,321 B1 * | 2/2001 | Takamine et al. | 369/47.44 |
| 6,636,469 B2 * | 10/2003 | Tomishima | 369/53.37 |
| 7,149,157 B2 * | 12/2006 | Yoon et al. | 369/53.29 |
| 2001/0043533 A1 | 11/2001 | Hahnfeld et al. | 369/53.22 |

FOREIGN PATENT DOCUMENTS

| | | |
|---|---|---|
| JP | 10-293960 | 11/1998 |
| JP | 2001-155417 | 6/2001 |
| JP | 2004-310846 | 11/2004 |

* cited by examiner

*Primary Examiner*—Thang V Tran
(74) *Attorney, Agent, or Firm*—Bacon & Thomas, PLLC

(57) ABSTRACT

There is provided a disk apparatus adapted to allow the rotational frequency of an optical disk to reach a predetermined rotational frequency soon for shifting to a reproducing operation, when setting up the rotation of the optical disk, even if the optical disk may have a large weight. The change in the rotational frequency of an optical disk is detected at a predetermined time interval; the rotational acceleration of the optical disk is calculated based on the detected change in the rotational frequency of the optical disk at the predetermined time interval; it is determined whether or not the weight of the optical disk is greater than that of a reference optical disk based on the difference between the calculated rotational acceleration of the optical disk and the rotational acceleration of the reference optical disk; and the driving voltage of a spindle motor is increased if it is determined that the weight of the optical disk is greater than that of the reference optical disk.

5 Claims, 4 Drawing Sheets

DISK APPARATUS

BACKGROUND OF THE INVENTION

1. Field of the Invention

The present invention relates to a disk apparatus for recording/reproducing information data onto/from an optical disk, particularly capable of setting up the rotation of the optical disk mounted on the disk apparatus soon for shifting to a reproducing operation even if the optical disk may have a large weight.

2. Description of the Prior Art

Commercial optical disks such as DVDs (Digital Versatile Disks) and CDs (Compact Disks) generally have a diameter of 12 cm or 8 cm and vary in weight due to disk type and/or material (e.g. polycarbonate, PMMA (polymethylmetacrylate)), etc. even if the standards may be met. Also, some commercial optical disks are not up to the standards. Further, if a user sticks a label on an optical disk for identification of the optical disk, the weight of the optical disk is increased by the weight of the label. FIG. 4 is an illustrative view showing the change in the rotational frequency of an optical disk due to the weight thereof. When a constant voltage V1 is applied to a spindle motor for rotating an optical disk to set up the rotation of the optical disk, the setup time for the rotation of an optical disk B that has a larger weight than a reference optical disk A is longer than that of the reference optical disk A as shown in FIG. 4. Therefore, if an optical disk mounted on a disk apparatus has a large weight, when setting up the rotation of the optical disk to reproduce information data recorded on the optical disk, it takes the rotational frequency of the optical disk a long time to reach a predetermined rotational frequency R0, resulting in a problem in that it also takes a long time to start the reproduction from the optical disk.

As a background art, there is known a method of: measuring the time from the setup of the rotation of a spindle motor until the rotation is stabilized; determining the weight of an optical disk based on the difference between the measured time and a reference time; and, if the optical disk is heavier or lighter than a reference disk, setting the optical disk reading speed within an allowable error range from a reference rotational frequency (refer to Japanese Patent Laid-Open Publication No. 2004-310846 for example).

There is also known a method of: detecting the rotational frequency of a spindle motor when setting up the rotation of an optical disk; calculating the change of the rotational frequency based on the detection result to determine the weight ratio of the optical disk; and setting a servo gain according to the weight ratio of the optical disk (refer to Japanese Patent Laid-Open Publication No. Hei 10-293960 for example).

There is further known a method of: measuring the gravimetrical factor of an optical disk; deciding the level and time of a reverse voltage to be applied to the spindle motor based on the measurement result; and applying the reverse voltage to the spindle motor to decelerate or stop the rotation of the optical disk (refer to Japanese Patent Laid-Open Publication No. 2001-155417 for example).

However, although the first one among the above-described background arts allows for: measuring the time from the setup of the rotation of a spindle motor until the rotation is stabilized; determining the weight of an optical disk based on the difference between the measured time and a reference time; and, if the optical disk is heavier or lighter than a reference disk, setting the optical disk reading speed within an allowable error range from a reference rotational frequency, the method is intended only to set the optical disk reading speed suitably for the mounted optical disk by confirming whether or not the optical disk is heavier or lighter than the reference disk before starting a reproducing operation for the optical disk, but to solve the above-described problem.

Although the next one allows for: detecting the rotational frequency of a spindle motor when setting up the rotation of an optical disk; calculating the change of the rotational frequency based on the detection result to determine the weight ratio of the optical disk; and setting a servo gain according to the weight ratio of the optical disk, the method is intended only to drive the spindle motor at a minimum current consumption according to the weight of the optical disk, but to solve the above-described problem.

Although the further next one allows for: measuring the gravimetrical factor of an optical disk; deciding the level and time of a reverse voltage to be applied to the spindle motor based on the measurement result; and applying the reverse voltage to the spindle motor to decelerate or stop the rotation of the optical disk, the method is intended only to absorb the variation of optical disk weight, variation of the power supply voltage for driving the spindle motor, and variation of the spindle motor to stop the rotation of the optical disk, but to solve the above-described problem.

SUMMARY OF THE INVENTION

The present invention has been made in consideration of the above-described problems included in the background arts, and an object thereof is to provide a disk apparatus adapted to allow the rotational frequency of an optical disk to reach a predetermined rotational frequency soon for shifting to a reproducing operation, when setting up the rotation of the optical disk, even if the optical disk may have a large weight.

In order to achieve the foregoing object, the present invention is directed to a disk apparatus for recording/reproducing information data onto/from an optical disk, including: rotational frequency detecting means for detecting the change in the rotational frequency of the optical disk at a predetermined time interval; calculating means for calculating the rotational acceleration of the optical disk based on the change in the rotational frequency of the optical disk at the predetermined time interval detected by the rotational frequency detecting means; determining means for determining whether or not the weight of the optical disk is greater than that of a reference optical disk based on the difference between the rotational acceleration of the optical disk calculated by the calculating means and the rotational acceleration of the reference optical disk; and first control means adapted to increase the driving voltage of a spindle motor, if it is determined by the determining means that the weight of the optical disk is greater than that of the reference optical disk.

The first control means is preferably adapted to increase the driving voltage of the spindle motor up to a first predetermined voltage according to the weight of the optical disk based on the difference between the rotational acceleration of the optical disk calculated by the calculating means and the rotational acceleration of the reference optical disk, if it is determined by the determining means that the weight of the optical disk is greater than that of the reference optical disk.

There is further provided second control means adapted to reduce the driving voltage of the spindle motor and to rotate the optical disk at a predetermined rotational frequency, when the rotational frequency of the optical disk reaches the predetermined rotational frequency.

The second control means is preferably adapted to reduce the driving voltage of the spindle motor down to a second predetermined voltage according to the weight of the optical disk based on the difference between the rotational acceleration of the optical disk calculated by the calculating means and the rotational acceleration of the reference optical disk and to rotate the optical disk at the predetermined rotational frequency.

In accordance with these means, it is possible to allow the rotational frequency of the optical disk to reach a predetermined rotational frequency soon for shifting to a reproducing operation, when setting up the rotation of the optical disk, even if the optical disk may have a large weight.

In accordance with the disk apparatus according to the first aspect of the present invention, the change in the rotational frequency of the optical disk is detected at the predetermined time interval; the rotational acceleration of the optical disk is calculated based on the detected change in the rotational frequency of the optical disk at the predetermined time interval; it is determined whether or not the weight of the optical disk is greater than that of the reference optical disk based on the difference between the calculated rotational acceleration of the optical disk and the rotational acceleration of the reference optical disk; the driving voltage of the spindle motor is increased up to a first predetermined voltage according to the weight of the optical disk based on the difference between the calculated rotational acceleration of the optical disk and the rotational acceleration of the reference optical disk if it is determined that the weight of the optical disk is greater than that of the reference optical disk; and the driving voltage of the spindle motor is reduced down to a second predetermined voltage according to the weight of the optical disk based on the difference between the calculated rotational acceleration of the optical disk and the rotational acceleration of the reference optical disk, when the rotational frequency of the optical disk reaches a predetermined rotational frequency, so that the optical disk is rotated at the predetermined rotational frequency. Therefore, if the weight of the optical disk is greater than that of the reference optical disk, it is possible to allow the rotational frequency of the optical disk to reach a predetermined rotational frequency soon for shifting to a reproducing operation, when setting up the optical disk, by increasing the driving voltage of the spindle motor and thereby the rotational acceleration of the optical disk, and after the rotational frequency of the optical disk reaches the predetermined rotational frequency, it is possible to rotate the optical disk at the predetermined rotational frequency by reducing the driving voltage of the spindle motor so that the rotational frequency of the optical disk keeps the predetermined rotational frequency.

In accordance with the disk apparatus according to the second aspect of the present invention, the change in the rotational frequency of the optical disk is detected at the predetermined time interval; the rotational acceleration of the optical disk is calculated based on the detected change in the rotational frequency of the optical disk at the predetermined time interval; it is determined whether or not the weight of the optical disk is greater than that of the reference optical disk based on the difference between the calculated rotational acceleration of the optical disk and the rotational acceleration of the reference optical disk; and the driving voltage of the spindle motor is increased if it is determined that the weight of the optical disk is greater than that of the reference optical disk. Therefore, if the weight of the optical disk is greater than that of the reference optical disk, it is possible to allow the rotational frequency of the optical disk to reach a predetermined rotational frequency soon, when setting up the optical disk, by increasing the driving voltage of the spindle motor and thereby the rotational acceleration of the optical disk.

In accordance with the disk apparatus according to the third aspect of the present invention, if it is determined that the weight of the optical disk is greater than that of the reference optical disk, the driving voltage of the spindle motor is increased up to a first predetermined voltage according to the weight of the optical disk based on the difference between the calculated rotational acceleration of the optical disk and the rotational acceleration of the reference optical disk. Therefore, if the weight of the optical disk is greater than that of the reference optical disk, it is possible to allow the rotational frequency of the optical disk to reach a predetermined rotational frequency soon, when setting up the optical disk, by increasing the driving voltage of the spindle motor up to a voltage according to the weight of the optical disk and thereby increasing the rotational acceleration of the optical disk.

In accordance with the disk apparatus according to the fourth aspect of the present invention, when the rotational frequency of the optical disk reaches the predetermined rotational frequency, the driving voltage of the spindle motor is reduced to rotate the optical disk at the predetermined rotational frequency. Therefore, after the rotational frequency of the optical disk reaches the predetermined rotational frequency, it is possible to rotate the optical disk at the predetermined rotational frequency by reducing the driving voltage of the spindle motor so that the rotational frequency of the optical disk keeps the predetermined rotational frequency.

In accordance with the disk apparatus according to the fifth aspect of the present invention, the driving voltage of the spindle motor is reduced down to a second predetermined voltage according to the weight of the optical disk based on the difference between the calculated rotational acceleration of the optical disk and the rotational acceleration of the reference optical disk so that the optical disk is rotated at the predetermined rotational frequency. Therefore, after the rotational frequency of the optical disk reaches the predetermined rotational frequency, it is possible to rotate the optical disk at the predetermined rotational frequency by reducing the driving voltage of the spindle motor down to a voltage according to the weight of the optical disk so that the rotational frequency of the optical disk keeps the predetermined rotational frequency.

DESCRIPTION OF THE PREFERRED EMBODIMENTS

Figure 1:
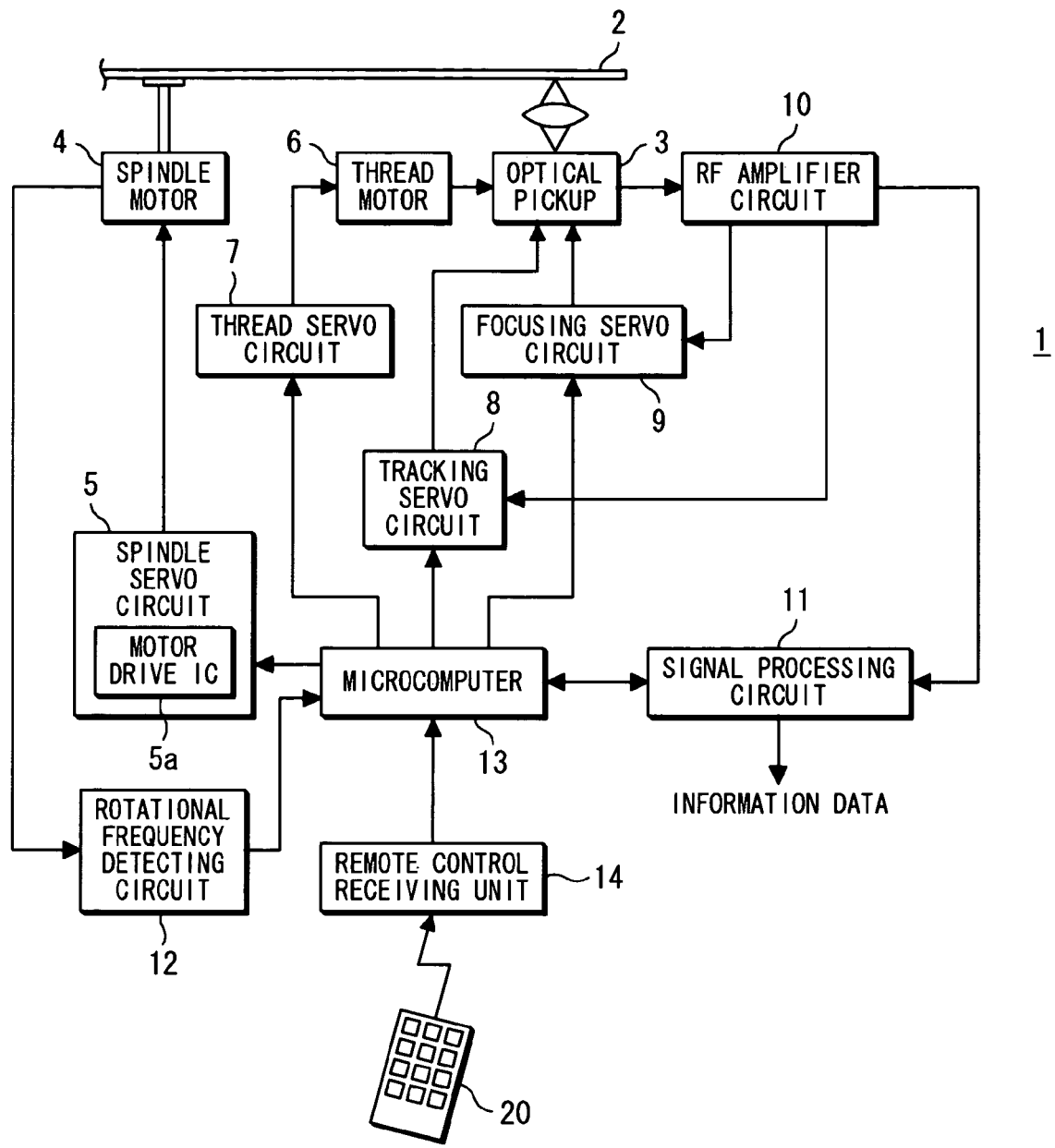
FIG. 1 is a block diagram showing the configuration of a disk apparatus according to an embodiment of the present invention.

The best mode for carrying out the present invention will hereinafter be described in detail with appropriate reference to the accompanying drawings. FIG. 1 is a block diagram showing the configuration of a disk apparatus according to an embodiment of the present invention; FIG. 2 is an illustrative view showing the operation of the disk apparatus according to the embodiment of the present invention; and FIG. 3 is a flow chart showing the operation of the disk apparatus according to the embodiment of the present invention.

First it will be described the configuration of the disk apparatus according to the embodiment of the present invention based on the block diagram shown in FIG. 1. The disk apparatus 1 is composed of: an optical pickup 3 for reading out information data recorded on an optical disk 2 by applying a laser beam to the recording surface of the optical disk 2 and detecting reflected light; a spindle motor 4 for rotating the optical disk 2; a spindle servo circuit 5 for driving the spindle motor 4 using a motor drive IC 5a to servo-control the rotational speed of the optical disk 2; a thread motor 6 for moving the optical pickup 3 threadably in the radial direction of the optical disk 2; a thread servo circuit 7 for servo-controlling the rotational direction and speed of the thread motor 6; a tracking servo circuit 8 for servo-controlling the tracking of the optical pickup 3 based on a tracking error signal detected by the optical pickup 3; a focusing servo circuit 9 for servo-controlling the focusing of the optical pickup 3 based on a focusing error signal detected by the optical pickup 3; an RF amplifier circuit 10 for amplifying an information data RF (Radio Frequency) signal read out by the optical pickup 3; a signal processing circuit 11 for reproducing the information data recorded on the optical disk 2 by synchronously detecting and demodulating the information data RF signal amplified by the RF amplifier circuit 10 based on a reference clock, correcting errors in the demodulated information data, and expanding and decoding the information data compressed based on a predetermined compression method; a rotational frequency detecting circuit 12 for detecting the rotational frequency of the optical disk 2 by detecting an FG (Frequency Generator) signal generated in response to the rotation of the spindle motor 4; a microcomputer 13 for controlling the entire system of the disk apparatus 1; and a remote control receiving unit 14 for receiving an infrared remote control signal transmitted from a remote control unit 20 and converting the signal into a predetermined electrical signal. The operation of the thus arranged disk apparatus will hereinafter be described.

Figure 2A:
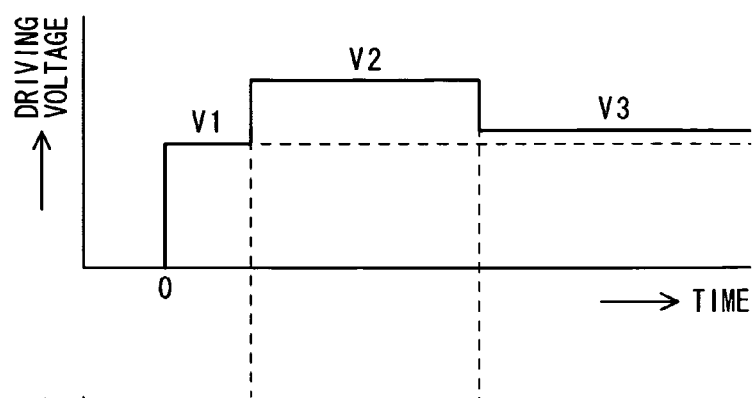
FIG. 2 is an illustrative view showing the operation of the disk apparatus according to the embodiment of the present invention.
Figure 3:
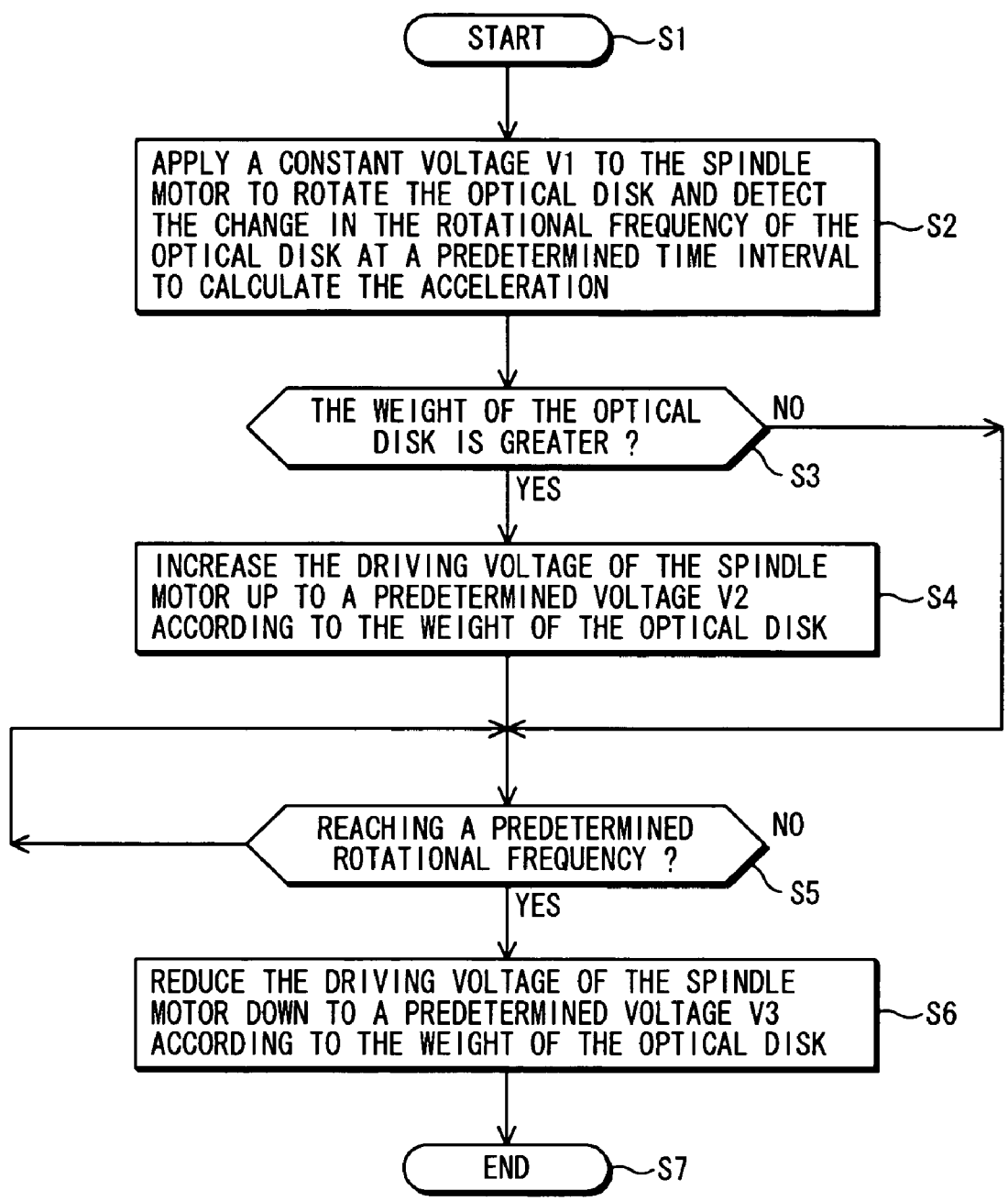
FIG. 3 is a flow chart showing the operation of the disk apparatus according to the embodiment of the present invention.
Figure 4A:
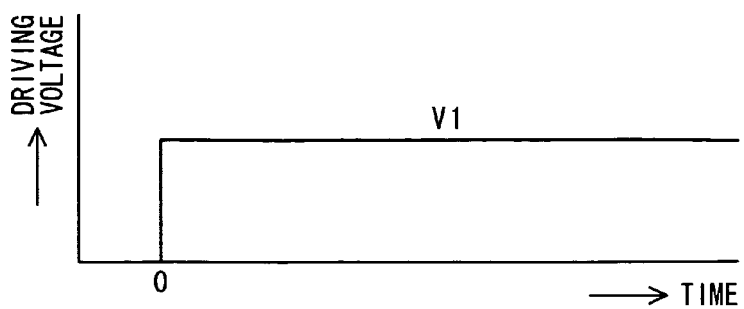
FIG. 4 is an illustrative view showing the change in the rotational frequency of an optical disk due to the weight thereof.
Figure 4B:
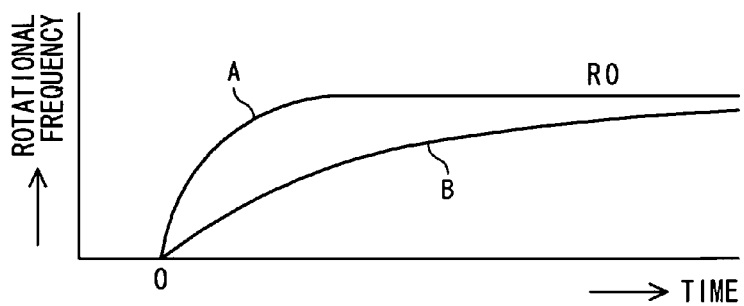

When the reproduction from the optical disk 2 mounted on the disk apparatus 1 is instructed through a key operation using the remote control unit 20, the microcomputer 13 sends a control signal to the spindle servo circuit 5 to control the motor drive IC 5a and to apply a constant voltage V1 to the spindle motor 4 to set up the rotation of the optical disk 2 (refer to FIG. 2(a)). When the rotation of the optical disk 2 is set up, the microcomputer 13 detects the rotational frequency of the optical disk 2 by detecting an FG signal generated in response to the rotation of the spindle motor 4 using the rotational frequency detecting circuit 12, and detects the change in the rotational frequency of the optical disk 2 at a predetermined time interval, and then calculates the rotational acceleration of the optical disk 2 based on the change in the rotational frequency of the optical disk 2 at the predetermined time interval detected by the rotational frequency detecting circuit 12. Then, the microcomputer 13 determines whether or not the weight of the optical disk 2 is greater than that of a reference optical disk based on the difference between the calculated rotational acceleration of the optical disk 2 and the rotational acceleration of the reference optical disk when the constant voltage V1 is applied to the spindle motor 4. If the weight of the optical disk 2 mounted on the disk apparatus 1 is greater than that of the reference optical disk, the rotational acceleration of the optical disk 2 is smaller than that of the reference optical disk, whereby the time required for the rotation of the optical disk 2 to reach a predetermined rotational frequency is longer than that for the rotation of the reference optical disk to reach the predetermined rotational frequency.

If the weight of the optical disk 2 is greater than that of the reference optical disk, in order to shorten the time required for the rotational frequency of the optical disk 2 mounted on the disk apparatus 1 to reach a predetermined rotational frequency R0 within a predetermined time period, the microcomputer 13 sends a control signal to the spindle servo circuit 5 to control the motor drive IC 5a and to increase the driving voltage of the spindle motor 4 up to a predetermined voltage V2 according to the weight of the optical disk 2 based on the difference between the rotational acceleration of the optical disk 2 mounted on the disk apparatus 1 and the rotational acceleration of the reference optical disk (refer to FIG. 2(a)). When the driving voltage of the spindle motor 4 for rotating the optical disk 2 is increased up to the predetermined voltage V2, the rotational acceleration of the optical disk 2 mounted on the disk apparatus 1 is also increased, whereby the time required for the rotational frequency of the optical disk 2 to reach the predetermined rotational frequency can be shortened (refer to FIG. 2(b)).

Figure 2B:
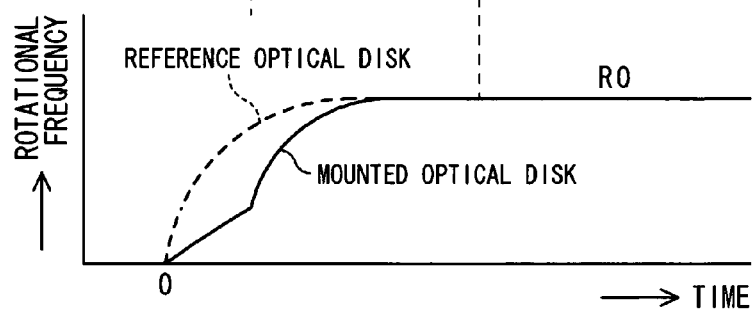

When the rotational frequency of the optical disk 2 mounted on the disk apparatus 1 reaches the predetermined rotational frequency (refer to FIG. 2(b)), the microcomputer 13 sends a control signal to the spindle servo circuit 5 to control the motor drive IC 5a and to reduce the driving voltage of the spindle motor 4 down to a predetermined voltage V3 according to the weight of the optical disk 2, based on the difference between the rotational acceleration of the optical disk 2 mounted on the disk apparatus 1 and the rotational acceleration of the reference optical disk, so that the optical disk 2 is rotated at the predetermined rotational frequency (refer to FIG. 2(a)), and then sends a control signal to the thread servo circuit 7 to drive the thread motor 6 and to move the optical pickup 3 threadably in the radial direction of the optical disk 2 so that the optical pickup 3 reads out and reproduces information data recorded on the optical disk 2. This allows the rotation of the optical disk to be set up soon for shifting to a reproducing operation even if the optical disk mounted on the disk apparatus may have a large weight.

The operation of the disk apparatus according to the embodiment of the present invention will also be described based on the flow chart shown in FIG. 3.

When the reproduction from the optical disk is instructed through a key operation using the remote control unit, the routine proceeds from step S1 to step S2. In step S2, a constant voltage V1 is applied to the spindle motor to set up the rotation of the optical disk mounted on the disk apparatus; the change in the rotational frequency of the optical disk at a predetermined time interval when setting up the rotation of the optical disk is detected; the rotational acceleration of the optical disk is calculated based on the change in the rotational frequency of the optical disk at the predetermined time interval; and the routine proceeds to step S3.

In step S3, it is determined whether or not the weight of the optical disk mounted on the disk apparatus is greater than that of the reference optical disk based on the difference between the calculated rotational acceleration of the optical disk and the rotational acceleration of the reference optical disk, and if the weight of the optical disk mounted on the disk apparatus is greater than that of the reference optical disk, the routine proceeds to step S4, while if the weight of the optical disk mounted on the disk apparatus is not greater than that of the reference optical disk, the routine proceeds to step S5.

In step S4, the driving voltage of the spindle motor is increased up to a predetermined voltage V2 according to the weight of the optical disk mounted on the disk apparatus based on the difference between the rotational acceleration of the optical disk mounted on the disk apparatus and the rotational acceleration of the reference optical disk, and the routine proceeds to step S5.

In step S5, it is determined whether or not the rotational frequency of the optical disk reaches a predetermined rotational frequency R0, and if the rotational frequency of the optical disk reaches the predetermined rotational frequency R0, the routine proceeds to step S6, while if the rotational frequency of the optical disk does not reach the predetermined rotational frequency R0, the routine repeats step S5.

In step S6, the driving voltage of the spindle motor is reduced down to a predetermined voltage V3 according to the weight of the optical disk based on the difference between the rotational acceleration of the optical disk mounted on the disk apparatus and the rotational acceleration of the reference optical disk, so that the optical disk is rotated at the predetermined rotational frequency, and then the routine proceeds to step S7 to complete the processing.

Although the best mode for carrying out the present invention has heretofore been described in detail, the present invention is not restricted thereto, and it will be appreciated that modifications and improvements may be made within the ordinary knowledge of those skilled in the art.

What is claimed is:

1. A disk apparatus for recording/reproducing information data onto/from an optical disk, comprising:
    rotational frequency detecting means for detecting the change in the rotational frequency of said optical disk at a predetermined time interval;
    calculating means for calculating the rotational acceleration of said optical disk based on the change in the rotational frequency of said optical disk at said predetermined time interval detected by said rotational frequency detecting means;
    determining means for determining whether or not the weight of said optical disk is greater than that of a reference optical disk based on the difference between the rotational acceleration of said optical disk calculated by said calculating means and the rotational acceleration of said reference optical disk;
    first control means adapted to increase the driving voltage of a spindle motor up to a first predetermined voltage according to the weight of said optical disk based on the difference between the rotational acceleration of said optical disk calculated by said calculating means and the rotational acceleration of said reference optical disk, if it is determined by said determining means that the weight of said optical disk is greater than that of said reference optical disk; and
    second control means adapted to reduce the driving voltage of said spindle motor down to a second predetermined voltage according to the weight of said optical disk based on the difference between the rotational acceleration of said optical disk calculated by said calculating means and the rotational acceleration of said reference optical disk and to rotate said optical disk at a predetermined rotational frequency, when the rotational frequency of said optical disk reaches said predetermined rotational frequency.

2. A disk apparatus for recording/reproducing information data onto/from an optical disk, comprising:
    rotational frequency detecting means for detecting the change in the rotational frequency of said optical disk at a predetermined time interval;
    calculating means for calculating the rotational acceleration of said optical disk based on the change in the rotational frequency of said optical disk at said predetermined time interval detected by said rotational frequency detecting means;
    determining means for determining whether or not the weight of said optical disk is greater than that of a reference optical disk based on the difference between the rotational acceleration of said optical disk calculated by said calculating means and the rotational acceleration of said reference optical disk; and
    first control means adapted to increase the driving voltage of a spindle motor, if it is determined by said determining means that the weight of said optical disk is greater than that of said reference optical disk.

3. The disk apparatus according to claim 2, wherein said first control means is adapted to increase the driving voltage of said spindle motor up to a first predetermined voltage according to the weight of said optical disk based on the difference between the rotational acceleration of said optical disk calculated by said calculating means and the rotational acceleration of said reference optical disk, if it is determined by said determining means that the weight of said optical disk is greater than that of said reference optical disk.

4. The disk apparatus according to claim 2, further comprising second control means adapted to reduce the driving voltage of said spindle motor and to rotate said optical disk at a predetermined rotational frequency, when the rotational frequency of said optical disk reaches said predetermined rotational frequency.

5. The disk apparatus according to claim 4, wherein said second control means is adapted to reduce the driving voltage of said spindle motor down to a second predetermined voltage according to the weight of said optical disk based on the difference between the rotational acceleration of said optical disk calculated by said calculating means and the rotational acceleration of said reference optical disk and to rotate said optical disk at said predetermined rotational frequency.

* * * * *